(12) United States Patent
Ramos et al.

(10) Patent No.: US 9,383,013 B2
(45) Date of Patent: *Jul. 5, 2016

(54) PISTON WITH REPLACEABLE AND/OR ADJUSTABLE SURFACES

(75) Inventors: Rolando Nico M. Ramos, West Palm Beach, FL (US); William W. Blodgett, Sea Island, GA (US)

(73) Assignee: LOBEPRO, INC., Brunswick, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/236,436

(22) PCT Filed: Aug. 2, 2012

(86) PCT No.: PCT/US2012/049324
§ 371 (c)(1),
(2), (4) Date: Jul. 31, 2014

(87) PCT Pub. No.: WO2013/019948
PCT Pub. Date: Feb. 7, 2013

(65) Prior Publication Data
US 2014/0331856 A1    Nov. 13, 2014

Related U.S. Application Data

(60) Provisional application No. 61/528,512, filed on Aug. 29, 2011, provisional application No. 61/514,687, filed on Aug. 3, 2011.

(51) Int. Cl.
*F03C 2/00* (2006.01)
*F03C 4/00* (2006.01)
(Continued)

(52) U.S. Cl.
CPC . *F16J 1/00* (2013.01); *F01C 21/08* (2013.01); *F04C 2/084* (2013.01); *F04C 2/123* (2013.01);
(Continued)

(58) Field of Classification Search
CPC .......... F04C 2/084; F04C 2/123; F04C 2/126; F04C 2230/60; F04C 2230/70; F04C 2230/80; F04C 2230/85; F04C 2230/00
USPC .................. 418/206.1–206.6, 1, 201.1, 201.3; 29/888.024

See application file for complete search history.

(56) References Cited

U.S. PATENT DOCUMENTS 3,558,246 A    1/1971   Philipp
6,827,565 B1  12/2004   Vogelsang
(Continued)

FOREIGN PATENT DOCUMENTS

| | | |
|---|---|---|
| DE | 3707722 A1 | 9/1988 |
| DE | 19708641 A1 | 9/1998 |
| DE | 10022097 C1 | 9/2001 |
| EP | 0599333 A1 | 6/1994 |

(Continued)

OTHER PUBLICATIONS

International Search Report from the U.S. Patent and Trademark Office for International Application No. PCT/US2012/049324, mailing date Oct. 24, 2012.

*Primary Examiner* — Theresa Trieu
(74) *Attorney, Agent, or Firm* — Finnegan, Henderson, Farabow, Garrett & Dunner, L.L.P.

(57) ABSTRACT

A piston for a pump includes a hub portion defining opposing outer surfaces and concave lateral portions between the opposing outer surfaces. The piston also includes inserts configured to provide a replaceable surface, the inserts being coupled to each of the opposing outer surfaces. A pump includes a housing having an inlet and an outlet, and at least two pistons having a hub portion and inserts. The pump may be a positive-displacement, rotary pump, and the pistons may be circumferential pistons.

22 Claims, 6 Drawing Sheets

(51) Int. Cl.
*F04C 18/00* (2006.01)
*F16J 1/00* (2006.01)
*F04C 2/08* (2006.01)
*F04C 2/12* (2006.01)
*F01C 21/08* (2006.01)

(52) U.S. Cl.
CPC ............ *F04C 2/126* (2013.01); *F04C 2230/60* (2013.01); *F04C 2230/602* (2013.01); *F04C 2230/80* (2013.01); *F04C 2230/85* (2013.01)

(56) References Cited

U.S. PATENT DOCUMENTS

| | | | |
|---|---|---|---|
| 8,087,914 B1 * | 1/2012 | Soderstrom | 418/206.5 |
| 9,017,052 B1 * | 4/2015 | Soderstrom | 418/206.5 |
| 2009/0123319 A1 | 5/2009 | Börger | |

FOREIGN PATENT DOCUMENTS

| | | | | |
|---|---|---|---|---|
| JP | 60-237189 A | * | 11/1985 | 418/206.5 |
| JP | 6-229385 A | * | 8/1994 | 418/206.5 |

* cited by examiner

PISTON WITH REPLACEABLE AND/OR ADJUSTABLE SURFACES

CLAIM OF PRIORITY

This application is a U.S. national phase entry under 35 U.S.C. §371 from PCT International Application No. PCT/US2012/049324, filed Aug. 2, 2012, which claims the benefit of priority of U.S. Provisional Application No. 61/528,512, filed Aug. 29, 2011, and U.S. Provisional Application No. 61/514,687, filed Aug. 3, 2011, the disclosures of all of which are incorporated herein by reference.

FIELD OF THE DISCLOSURE

The present disclosure relates to a piston with replaceable surfaces, and in particular, a piston with replaceable and/or adjustable outer surfaces.

BACKGROUND

Pumps come in many forms, including, for example, rotodynamic pumps, sometimes referred to as "centrifugal pumps," and positive-displacement pumps. Some positive-displacement pumps include one or more pistons configured to displace materials including fluid such as air, liquid, and/or materials including a combination of fluid, semi-solid materials, and solid materials, such as, for example, sludge. In such pumps, in order to improve operation it may be desirable provide a relatively close fit between the one or more pistons and the housing in which the one or more pistons move. However, providing a relatively close fit may result in drawbacks relating to wear and galling of the one or more pistons and/or the housing.

For example, a positive-displacement, rotary pump having circumferential pistons may be used to pump liquid having therein semi-solid and solid material. In such pumps, providing a relatively close fit between the outer surfaces of the pistons and the pump housing may provide several potential advantages. For example, a relatively close fit may prevent semi-solids and solids from accumulating between the outer surface of the pistons and the pump housing, thereby preventing pump damage. In addition, a relatively close fit may facilitate higher pump pressure by providing a close fit along a sealing line between the piston outer surface and the housing. In addition, a relatively close fit may result in the pump being self-priming.

However, a relatively close fit between the pistons and the housing may result in, for example, galling of the surfaces of the pistons and/or housing. One potential solution to this possible drawback would be to form the pistons from non-galling materials. However, such materials may be expensive. Further, such materials may wear relatively rapidly in abrasive applications.

Therefore, it may be desirable to provide a piston for pumps that may mitigate or solve one or more of the above-noted potential drawbacks.

SUMMARY

In accordance with one aspect of the disclosure, a piston for a pump includes a hub portion defining opposing outer surfaces and concave lateral portions between the opposing outer surfaces. The piston also includes inserts configured to provide a replaceable surface, the inserts being coupled to each of the opposing outer surfaces. According to another aspect, the hub portion includes two lateral hub halves coupled to one another. According to a further aspect, the inserts include a base portion and an outer shell. According to still a further aspect, the lateral hub halves define a recess, and the base portion of the inserts includes a ridge received in the recesses of the lateral hub halves. According to yet another aspect, the inserts are coupled to the opposing outer surfaces via fasteners. According to a further aspect, the hub portion defines apexes of the opposing outer surfaces, and the inserts are coupled to the hub portion at the apexes. According to still another aspect, the apexes define mounting recesses, and the inserts include projections received in the mounting recesses. According to yet another aspect, the inserts are coupled to the mounting recesses via fasteners. According to a further aspect, the hub portion defines lateral recesses, the inserts include lateral mounting flanges and an outer shell extending between the lateral mounting flanges, and the lateral mounting flanges are received in the lateral recesses of the hub portion. According to still another aspect, the lateral flanges of the inserts are coupled to the hub portion via fasteners. According to a further aspect, the hub portion defines a bore configured to receive a pump shaft, and the hub portion defines holes extending between the bore and the outer surfaces. According to still a further aspect, fasteners extend through the holes and couple the inserts to the hub portion. According to another aspect, the hub portion includes at least one of steel, white iron, and duplex. According to a further aspect, the inserts include at least one of a non-galling material and a material having a low coefficient of friction. According to still a further aspect, the piston is a circumferential piston.

According to yet another aspect, a piston includes at least one shim between the hub portion and at least one of the inserts. According to a further aspect, the at least one shim has a substantially constant cross-section. According to another aspect, the at least one shim has a non-uniform cross-section. According to still another aspect, the at least one shim has a profile that substantially matches a profile of the hub portion.

According to yet another aspect, a method for adjusting a distance between the center of the hub portion and the outer surface of the inserts includes providing or removing at least one shim from between the hub portion and the inserts. According to another aspect, a method for adjusting the suction of a pump includes providing or removing at least one shim from between the hub portion and the inserts.

According to a further aspect, a pump includes a housing having an inlet and an outlet, and at least two pistons according to any one of the above-noted aspects. According to still a further aspect, the pump is a positive-displacement, rotary pump, and the pistons are circumferential pistons.

It is to be understood that both the foregoing general description and the following detailed description are exemplary and explanatory only and are not restrictive of the invention, as claimed.

The accompanying drawings, which are incorporated in and constitute a part of this specification, illustrate several exemplary embodiments of the disclosure and together with the description, serve to explain some principles.

DESCRIPTION OF EXEMPLARY EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
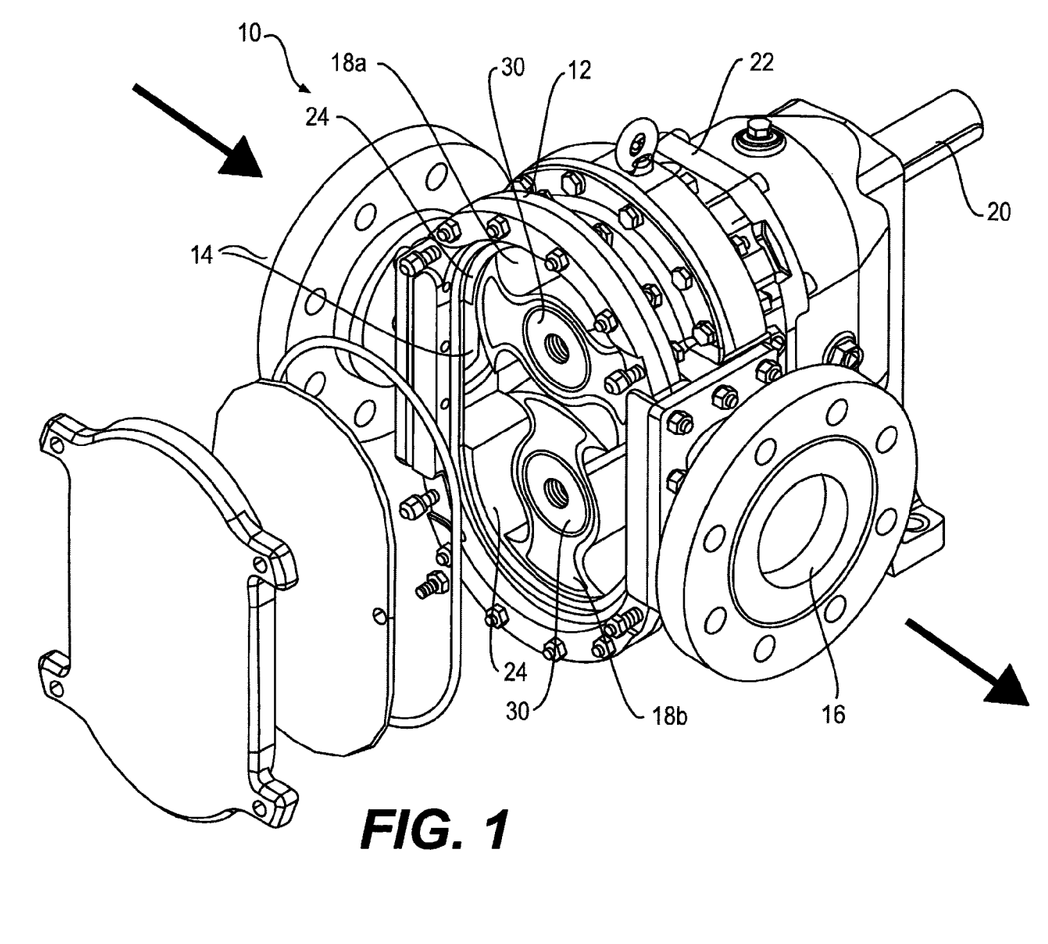
FIG. 1 is a perspective assembly view of an exemplary embodiment of a positive-displacement, rotary pump.

FIG. 1 shows an exemplary embodiment of a pump 10 for pumping material, including liquid, semi-solids, solids, and/or a combination thereof. Exemplary pump 10 is a positive-displacement, rotary pump and includes a housing 12 having an inlet 14 for receiving a material being pumped and an outlet 16 for expelling the pumped material. The exemplary housing 12 contains two circumferential pistons 18a and 18b configured to rotate within housing 12 along respective axes substantially perpendicular to a path of the material being pumped. Although the exemplary pistons 18a and 18b shown in FIGS. 1-6B include two opposing lobes, it is contemplated that pistons 18a and 18b may include more than two opposing lobes, such as, for example, three, four, or five opposing lobes. Pump 10 also includes an input shaft 20 configured to be coupled to a prime mover (not shown), such as, for example, an engine or motor. Input shaft 20 drives a gearbox assembly 22 coupled to pistons 18a and 18b, such that pistons 18a and 18b are driven at the same rotational speed in opposite directions.

In the exemplary embodiment shown, as pistons 18a and 18b rotate within housing 12, suction is created between the respective outer surfaces of pistons 18a and 18b and inner surfaces 24 of housing 12, thereby pulling material into inlet 14. The outer surfaces of pistons 18a and 18b and inner surfaces 24 of housing 12 have substantially complimentary radii, resulting in an ability to create greater suction for pulling material into housing inlet 14 due to a greater overlapping area between the outer surfaces of pistons 18a and 18b and inner surfaces 24 of housing 12. For example, pump 10 may be able to develop 100 pounds per square inch or more pressure. Pistons 18a and 18b operate as scoops to convey material entering via inlet 14 to outlet 16, thereby potentially being able to pump materials having solids of 0.75 inch or more in the material. According to some embodiments, inner surfaces 24 of housing 12 may be configured to be replaced without replacing other portions of housing 12. This may permit the use of relatively high wear materials (e.g., materials having anti-galling characteristics) for the inner surface 24.

Figure 2A:
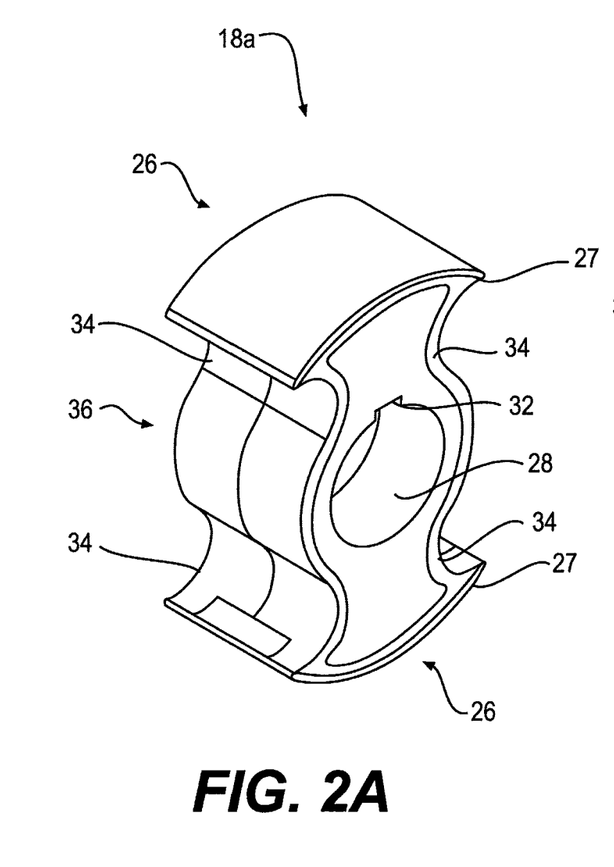
FIG. 2A is a perspective view of an exemplary embodiment of a circumferential piston for a rotary pump.
Figure 2B:
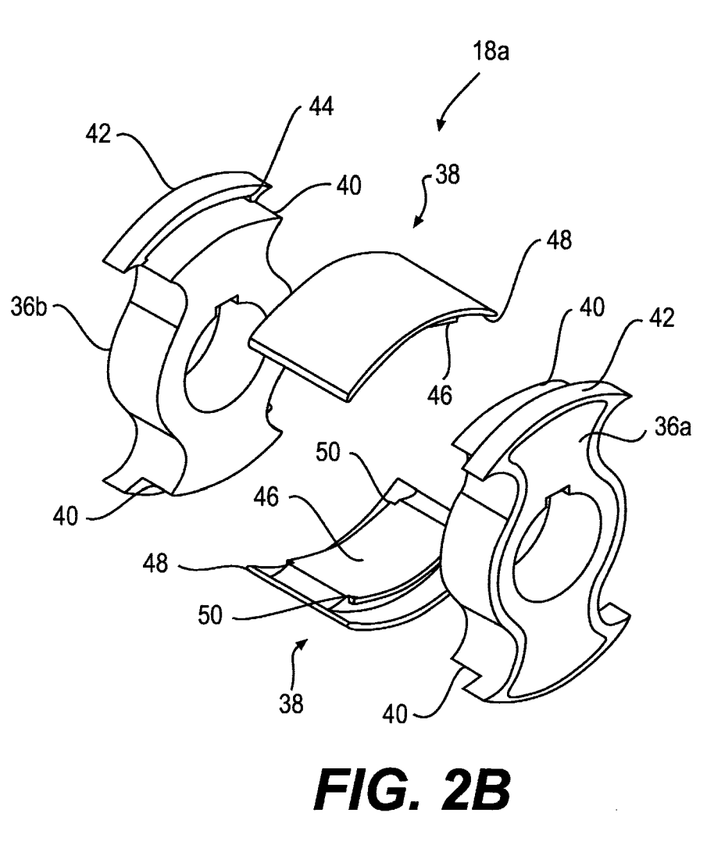
FIG. 2B is a perspective assembly view of the exemplary piston shown in FIG. 2A.

Referring to FIGS. 2A and 2B, exemplary piston 18a includes replaceable surfaces 26. For example, in the exemplary embodiment shown in FIGS. 2A and 2B, piston 18a defines an outer diameter presenting two opposing outer surfaces 27 (e.g., opposing arc-shaped surfaces as shown in FIG. 2A or substantially planar surfaces). Between surfaces 27, a bore 28 is provided for mounting piston 18a on a shaft 30 driven by gearbox assembly 22 (FIG. 1). A keyway 32 associated with bore 28 is provided for preventing rotation of piston 18a relative to shaft 30. A pair of lateral concave scoop sections 34 are provided on each opposing side of piston 18a.

According to the exemplary embodiment shown in FIGS. 2A and 2B, surfaces 26 may be replaced. As shown in FIG. 2B, piston 18a includes a hub portion 36 including two opposing lateral hub halves 36a and 36b and two opposing surface inserts 38. Each piston half 36a and 36b includes a recess 40 and a raised portion 42 at the outer diameter of piston half 36a and 36b. In the exemplary embodiment shown, a groove 44 is provided in raised portion 42.

Exemplary inserts 38 include a centrally-located base portion 46 and an outer shell 48. Base portion 46 includes ridges 50 configured to be received in grooves 44 of piston halves 36a and 36b. The outer shell 48 extends over raised portions 42 of piston halves 36a and 36b. Piston halves 36a and 36b are coupled to one another, thereby sandwiching inserts 38 between piston halves 36a and 36b. Piston halves 36a and 36b may be coupled to one another with, for example, one or more fasteners (not shown), such as screws or bolts. By separating piston halves 36a and 36b from one another, inserts 38 may be removed and either reconditioned or replaced. According to some embodiments, shims may be used to increase the outer diameter defined by outer shells 48, for example, to provide a closer fit between inserts 38 and inner surfaces 24 of housing 12. This may permit continued use of inserts 38 as they wear thinner from use. Such shims may be placed between base 46 of inserts 38 and recess 40 of piston halves 36a and 36b.

Because surfaces 26 may be replaced by replacing inserts 38, pistons 18a and 18b may be dimensioned to provide a relatively close fit with inner surfaces 24 of housing 12. This may prevent semi-solids and solids from accumulating between surface 26 and inner surfaces 24 of housing 12, thereby reducing the likelihood of possible pump damage. In addition, a relatively close fit between surfaces 26 and inner surfaces 24 may facilitate higher pump pressure, and may result pump being self-priming.

Normally, a close fit might result in damage to the pistons and inner surfaces of the housing pump due to, for example, galling. Thus, in order to provide a close fit the pistons would need to be made of special materials that might be undesirably expensive. By virtue of surfaces 26 being replaceable, hub portion 36 may be made of relatively less expensive material (e.g., steel, gray iron, ductile iron, stainless steel, plastics (e.g., when the substance being pumped is corrosive to metals), and/or other less expensive materials), with only inserts 38 being formed of materials such as anti-galling materials and/or materials having a relatively low coefficient of friction. Examples of non-galling materials include, but are not limited to, alloys having a relatively high nickel content and one or more of carbon, manganese, silicon, cobalt, phosphorous, sulfur, copper, molybdenum, iron, chromium, columbium/niobium, Wolfram, vanadium, bismuth, and stannum, which may result in alloys having a high threshold against galling stress. Such alloys include, but are not limited to, ASTM A494/A494M-09'1 CZ100, ASTM A494/A494M-09'1 CW2M, ASTM A494/A494M-09'1 CW6MC, ASTM A494/A494M-09'1 CY5SnBiM, ASTM A494/A494M-09'1 CW12MW, ASTM A494/A494M-09'1 CU5MCuC, ASTM A494/A494M-09'1 CW6MC, and ASTM A494/A494M-09'1 CY40. Other examples of non-galling materials include, but are not limited to soft, non-galling stainless steel, "Waukesha 88" (a nickel-based alloy including one or more of tin, iron, bismuth, and chromium), 808 stainless steel (sometimes known as "Ilium 8" or ASTM A494/A494M-09 Cy5SnBiM). Other non-galling materials include nickel-based alloys such as monel, hastalloy, and inconel, which may have a relatively high threshold of galling stress. Use of such materials for inserts 38 may result in an ability to pump low-viscosity fluids.

Examples of materials having a relatively low coefficient of friction include, but are not limited to, TEFLON® (polytetrafluoroethylene) and materials coated and/or impregnated with TEFLON®, such as, for example, aluminum, titanium, steel stainless steel, monel, inconel, brass, and bronze. TEFLON® and materials coated or impregnated with TEFLON® may result in improved volumetric pump efficiency, which may also allow build-up of higher pump pressures. According to some embodiments, inserts 38 may be formed from plastics, such as, for example, thermoplastic fluoropolymers such as polyvinylidene difluoride (PVDF) and homopolymer acetals, such as DELRIN®, and/or combinations thereof. Formation of inserts 38 using other plastics and materials is contemplated.

Figure 3A:
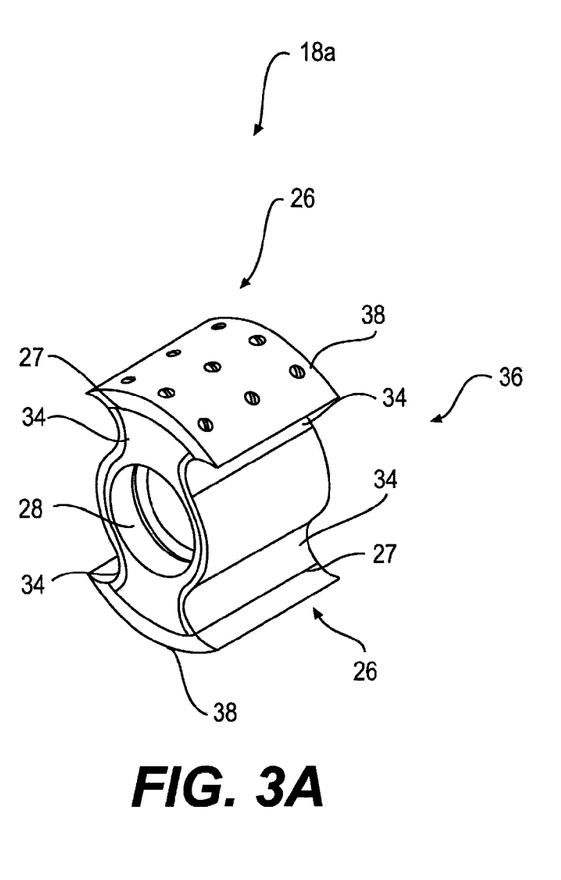
FIG. 3A is a perspective view of another exemplary embodiment of a circumferential piston for a rotary pump.
Figure 3B:
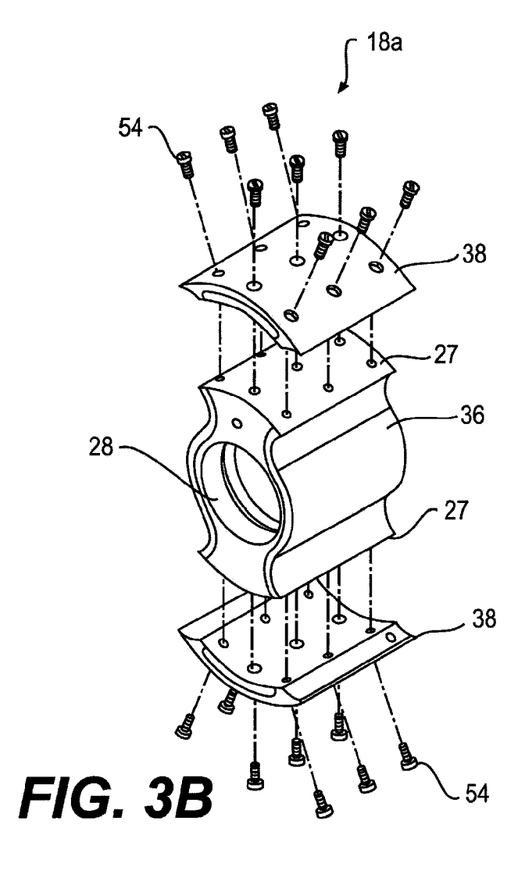
FIG. 3B is a perspective assembly view of the exemplary piston shown in FIG. 3A.

Similar to the exemplary embodiment shown in FIGS. 2A and 2B, in the exemplary embodiment shown in FIGS. 3A and 3B, surfaces 26 may be replaced. As shown in FIG. 3B, piston 18a includes a unitary hub portion 36 defining an outer diameter presenting two opposing surfaces 27, such as the opposing arc-shaped surfaces shown in FIGS. 3A and 3B. Between surfaces 27, hub portion 36 includes a bore 28 for mounting piston 18a on shaft 30 driven by gearbox assembly 22. A keyway 32 associated with bore 28 is provided for preventing rotation of piston 18a relative to shaft 30. A pair of concave scoop sections 34 are provided on each opposing side of piston 18a.

In the exemplary embodiment shown in FIGS. 3A and 3B, two opposing replaceable inserts 38 are located at the outer diameter of hub portion 36. Inserts 38 may be coupled to hub portion 36 by one or more fasteners 54, such as, for example, screws or bolts. Although not shown, the outer diameter of hub portion 36 and/or an inner surface inserts 38 may include structures such as one or more ridges and/or grooves configured to align or maintain alignment of inserts 38 on hub portion 36.

Figure 4A:
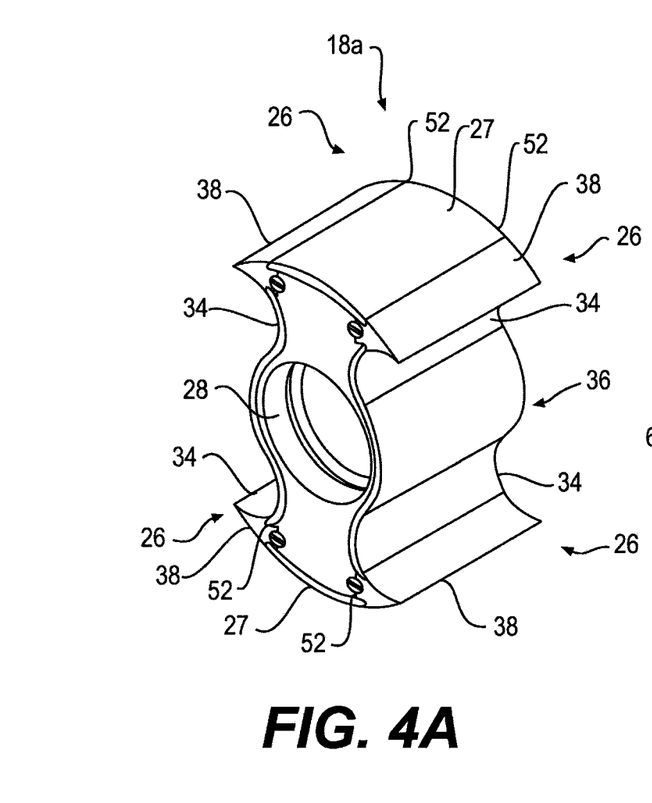
FIG. 4A is a perspective view of another exemplary embodiment of a circumferential piston for a rotary pump.
Figure 4B:
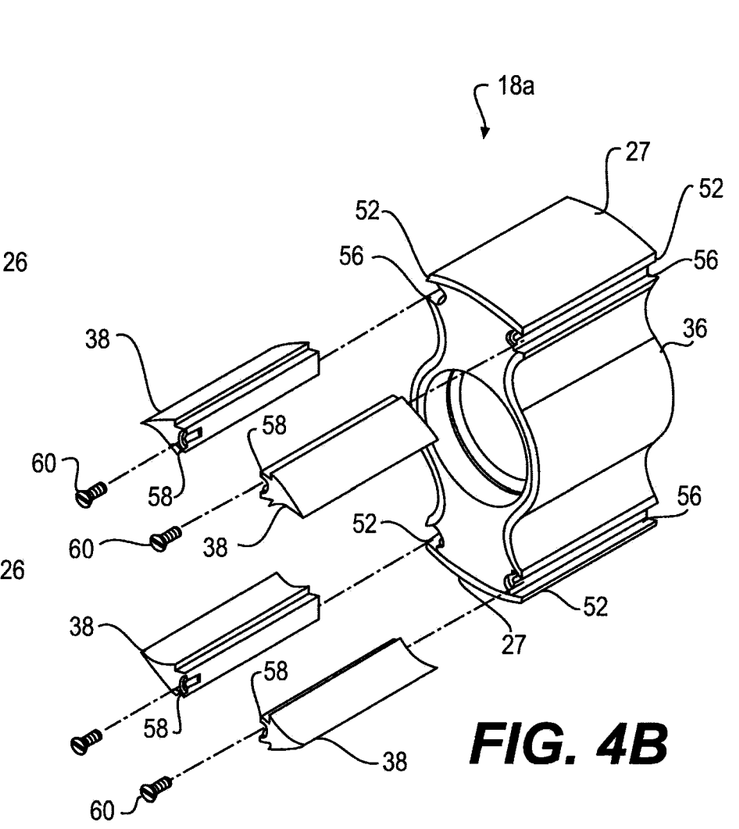
FIG. 4B is a perspective assembly view of the exemplary piston shown in FIG. 4A.

In the exemplary embodiment shown in FIGS. 4A and 4B, surfaces 26 may be replaced. In this exemplary embodiment, piston 18a includes a unitary hub portion 36 defining an outer diameter presenting two opposing surfaces 27, such as opposing arc-shaped surfaces shown in FIGS. 4A and 4B. Between surfaces 27, hub portion 36 includes a bore 28 for mounting piston 18a on shaft 30 driven by gearbox assembly 22. A keyway 32 associated with bore 28 is provided for preventing rotation of piston 18a relative to shaft 30. A pair of concave scoop sections 34 are provided on each opposing side of piston 18a.

As shown in FIG. 4B, piston 18a includes opposing replaceable inserts 38 that may be placed at the apexes 52 of surfaces 27 at the ends of concave portions 34 of hub portion 36. In the exemplary embodiment shown, mounting recesses 56 may be provided at each of apexes 52, and each of exemplary inserts 38 may include a cross-sectional projection 58 configured to be received in mounting recesses 56. Inserts 38 may be secured to hub portion 36 by, for example, one or more fasteners 60, such as, for example, screws or bolts. By virtue of fasteners 60 not being exposed to the outer circumferential surface of pistons 18a and 18b, it may be relatively easier to remove fasteners 60 when servicing or replacing inserts 38, since fasteners 60 are not exposed to the material being pumped or the inner surfaces 24 of housing 12.

Figure 5A:
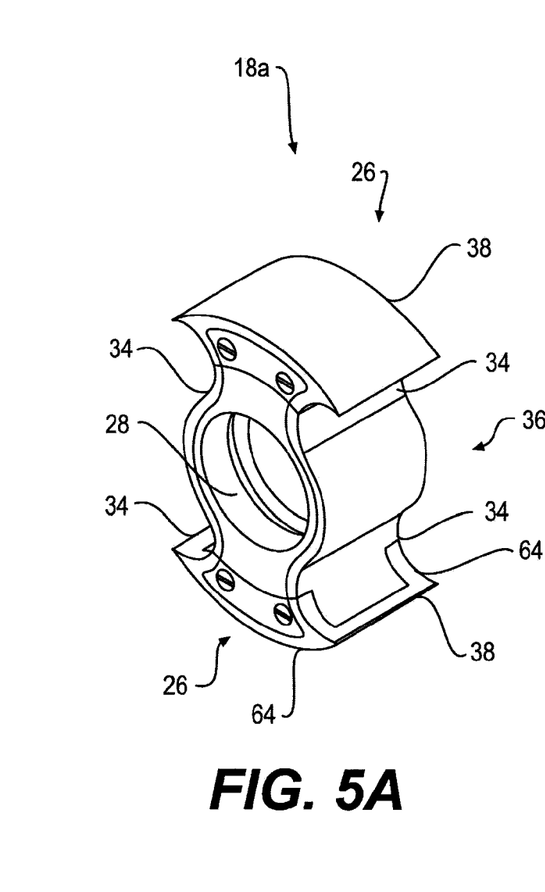
FIG. 5A is a perspective view of another exemplary embodiment of a circumferential piston for a rotary pump.
Figure 5B:
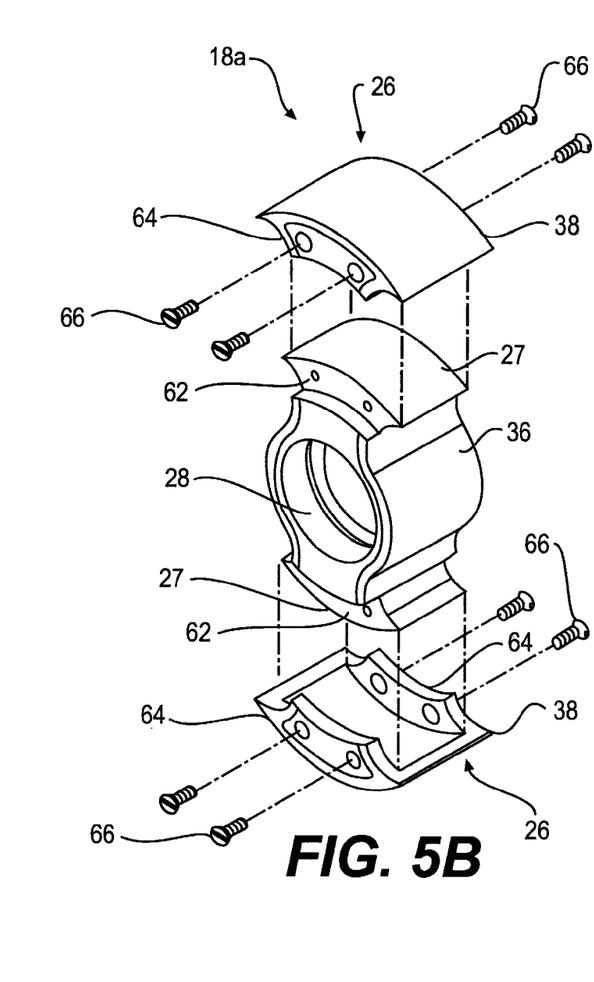
FIG. 5B is a perspective assembly view of the exemplary piston shown in FIG. 5A.

In the exemplary embodiment shown in FIGS. 5A and 5B, surfaces 26 may be replaced. In this exemplary embodiment, piston 18a includes a unitary hub portion 36 defining an outer diameter presenting two opposing outer surfaces 27, such as the opposing arc-shaped surfaces shown in FIGS. 5A and 5B. Between surfaces 27, hub portion 36 includes a bore 28 for mounting piston 18a on shaft 30 driven by gearbox assembly 22. A keyway 32 associated with bore 30 is provided for preventing rotation of piston 18a relative to shaft 30. A pair of concave scoop sections 34 are provided on each opposing side of piston 18a.

In the exemplary embodiment shown in FIGS. 5A and 5B, exemplary hub portion 36 includes lateral recesses 62 adjacent surfaces 27, and exemplary inserts 38 each include a pair lateral mounting flanges 64 and an outer shell 48 extending between lateral mounting flanges 64. Inserts 38 may be secured to hub portion 36 by, for example, one or more fasteners 66 (e.g., screws or bolts), which secure lateral mounting flanges 64 to lateral recesses 62 of hub portion 36. By virtue of fasteners 66 not being exposed to the outer circumferential surface of pistons 18a and 18b, it may be relatively easier to remove fasteners 66 when servicing or replacing inserts 38, since fasteners 66 are not exposed to the material being pumped or the inner surfaces 24 of housing 12.

Figure 6A:
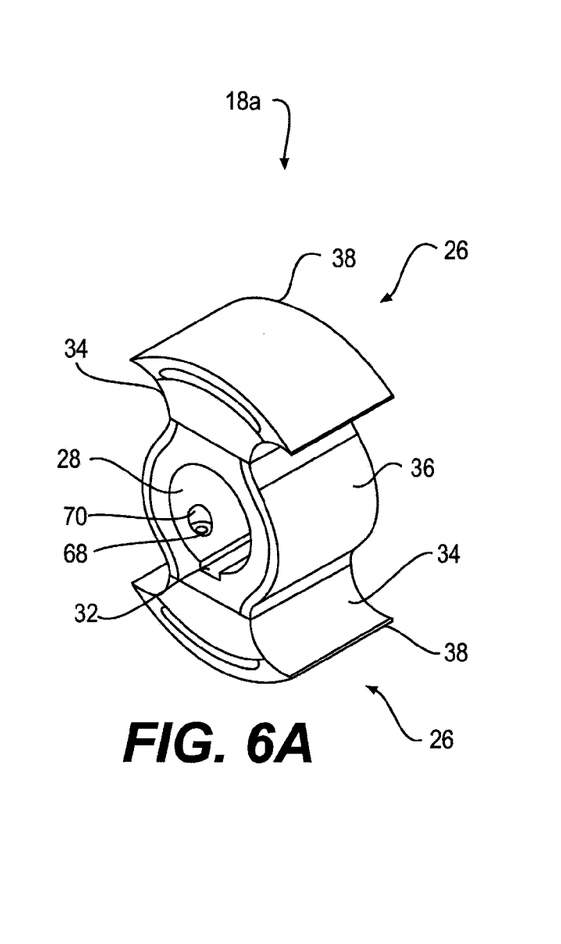
FIG. 6A is a perspective view of another exemplary embodiment of a circumferential piston for a rotary pump.
Figure 6B:
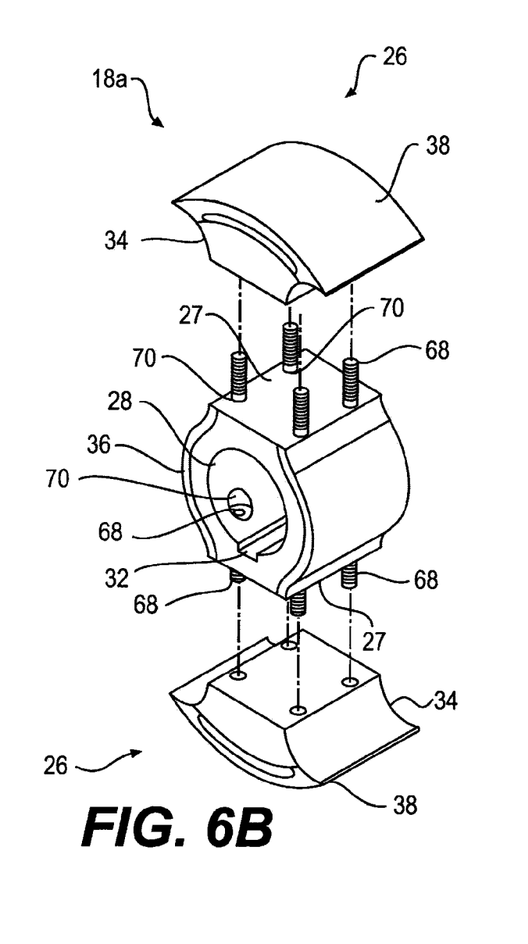
FIG. 6B is a perspective assembly view of the exemplary piston shown in FIG. 5A.

In the exemplary embodiment shown in FIGS. 6A and 6B, surfaces 26 may be replaced. As shown in FIG. 6B, piston 18a includes a unitary hub portion 36 defining opposing outer surfaces 27, such as the substantially planar opposing outer surfaces shown in FIGS. 6A and 6B. Between surfaces 27, hub portion 36 includes a bore 28 for mounting piston 18a on shaft 30 driven by gearbox assembly 22. A keyway 32 associated with bore 28 is provided for preventing rotation of piston 18a relative to shaft 30. A pair of concave scoop sections 34 are provided on each opposing side of piston 18a.

In the exemplary embodiment shown in FIGS. 6A and 6B, two opposing replaceable inserts 38 are located at surfaces 27 of hub portion 36. Inserts 38 may be coupled to hub portion 36 by one or more fasteners 68, such as, for example, screws or bolts. Holes 70 extend from bore 28 of hub portion 36 to surfaces 27, and fasteners 68 extend through holes 70 into inserts 38, thereby coupling inserts 38 to hub portion 36. Thus, fasteners 68 may be accessible for assembly and disassembly of inserts 38 with respect to hub portion 36 via bore 28. By virtue of fasteners 68 not being exposed to the outer circumferential surface of pistons 18a and 18b, it may be relatively easier to remove fasteners 68 when servicing or replacing inserts 38, since fasteners 68 are not exposed to the material being pumped or the inner surfaces 24 of housing 12.

Inserts 38 shown in FIGS. 6A and 6B may at least partially define scoop sections 34. Although not shown, surfaces 27 of hub portion 36 and/or an inner surface inserts 38 may include structures such as one or more ridges and/or grooves configured to align or maintain alignment of inserts 38 on hub portion 36.

According to some embodiments, replaceable surfaces 26 may facilitate dimensioning pistons 18a and 18b and inner surface 24 of housing 12 to have a close fit. A potential problem with having a close fit is galling of the outer surfaces of pistons 18a and 18b and/or inner surfaces 24 of housing 12. One potential solution to this problem would be to use a non-galling material for the pistons. However, such materials are generally very expensive, soft, and consequently wear rapidly in abrasive applications. By providing pistons 18a and 18b with replaceable surfaces 26, non-galling materials can be limited to the replaceable surfaces 26, while the remaining portion of pistons 18a and 18b can be made of more suitable materials, such as steel, white iron, duplex, and/or other less expensive materials.

According to some embodiments, it may be possible to adjust the surfaces 26 of any of the exemplary pistons 18a described herein, such that the outer surface of the surfaces 26 is farther from the center of piston 18a. For example, for any of the exemplary pistons 18a described herein, one or more shims may be placed between hub portion 36 and at least one of inserts 38, with inserts 38 thereafter being secured to hub portion 36 according to the exemplary embodiments described herein. As a result, the one or more shims will be sandwiched between a respective hub portion 36 and insert 38, thereby increasing the distance from the center of hub portion 36 and the outer surface of the respective insert 38.

The one or more shims may be relatively thin and may have a substantially constant cross-section. According to some embodiments, the shims may have a non-uniform cross-section. According to some embodiments, the shims may have a slightly curved profile that substantially matches the profile of hub portion 36.

The one or more shims may provide adjustability of the distance between the center of hub portion 36 and an outer surface of inserts 38. This may permit continued use of the same inserts 38 as the inserts 38 wear and become thinner. By providing one or more shims between the hub portion 36 and inserts 38, the useful life of the inserts 38 may be lengthened by maintaining the distance between the center of hub portion 36 and the outer surface of the respective insert 38. In addition, the use of one or more shims may permit adjustment of the suction of pump 10, for example, by increasing or decreasing the distance between the center of hub portion 36 and the outer surface of insert 38. Decreasing the distance may generally result in less suction, and increasing the distance by adding one or more shims between hub portion 36 and a respective insert 38 may result in more suction.

Other embodiments of the disclosure will be apparent to those skilled in the art from consideration of the specification and practice of the embodiments disclosed herein. It is intended that the specification and examples be considered as exemplary only, with a true scope and spirit of the disclosure being indicated by the following claims.

What is claimed is:

1. A piston for a pump, the piston comprising:
   a hub portion defining opposing outer surfaces and concave lateral portions between the opposing outer surfaces; and
   inserts configured to provide a replaceable surface coupled to each of the opposing outer surfaces,
   wherein the hub portion comprises two lateral hub halves coupled to one another, and
   wherein the inserts comprise a base portion and outer shell.

2. The piston of claim 1, wherein the lateral hub halves define a recess, and the base portion of the insert comprises a ridge received in the recesses of the lateral hub halves.

3. The piston of claim 1, wherein the hub portion comprises at least one of steel, white iron, and duplex.

4. The piston of claim 1, wherein the inserts comprise at least one of a non-galling material and a material having a low coefficient of friction.

5. The piston of claim 1, wherein the piston is a circumferential piston.

6. The piston of claim 1, further comprising at least one shim between the hub portion and at least one of the inserts.

7. The piston of claim 6, wherein the at east one shim has a substantially constant cross-section.

8. The piston of claim 6, wherein the at least one shim has a non-uniform cross-section.

9. The piston of claim 6, wherein the at least one shim has a profile that substantially matches a profile of the hub portion.

10. A piston for a pump, the piston comprising:
    a hub portion defining opposing outer surfaces and concave lateral portions between the opposing outer surfaces; and
    inserts configured to provide a replaceable surface coupled to each of the opposing outer surfaces,
    wherein the hub portion defines lateral recesses and the inserts comprise lateral mounting flanges and an outer shell extending between the lateral mounting flanges, and wherein the lateral mounting flanges are received in the lateral recesses of the hub portion.

11. The piston of claim 10, wherein the lateral flanges of the inserts are coupled to the hub portion via fasteners.

12. The piston of claim 10, wherein the hub portion comprises at least one of steel, white iron, and duplex.

13. The piston of claim 10, wherein the inserts comprise at least one of a non-galling material and a material having a low coefficient of friction.

14. The piston of claim 10, wherein the piston is a circumferential piston.

15. The piston of claim 10, further comprising at least one shim between the hub portion and at least one of the inserts.

16. The piston of claim 15, wherein the at least one shim has a substantially constant cross-section.

17. The piston of claim 15, wherein the at least one shim has a non-uniform cross-section.

18. The piston of claim 15, wherein the at least one shim has a profile that substantially matches a profile of the hub portion.

19. A pump comprising:
    a housing having an inlet and an outlet; and
    at least two pistons, wherein each of the pistons comprises:
        a hub portion defining opposing outer surfaces and concave lateral portions between the opposing outer surfaces; and
        inserts configured to provide a replaceable surface coupled to each of the opposing outer surfaces,
        wherein the hub portion comprises two lateral hub halves coupled to one another, and
        wherein the inserts comprise a base portion and an outer shell.

20. The pump of claim 19, wherein the pump is a positive-displacement, rotary pump and the pistons are circumferential pistons.

21. A pump comprising:
    a housing having an inlet and an outlet; and
    at least two pistons, wherein each of the pistons comprises:
        a hub portion defining opposing outer surfaces and concave lateral portions between the opposing outer surfaces; and
        inserts configured to provide a replaceable surface coupled to each of the opposing outer surfaces,
        wherein the hub portion defines lateral recesses and the inserts comprise lateral mounting flanges and an outer shell extending between the lateral mounting flanges, and wherein the lateral mounting flanges are received in the lateral recesses of the hub portion.

22. The pump of claim 21, wherein the pump is a positive-displacement, rotary pump, and the pistons are circumferential pistons.

* * * * *